United States Patent
Nagai et al.

(10) Patent No.: US 7,184,773 B2
(45) Date of Patent: Feb. 27, 2007

(54) SPATIAL PATH CONTROL IN RADIO COMMUNICATION SYSTEM (75) Inventors: Makoto Nagai, Kakamigahara (JP); Yoshiharu Doi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/505,753

(22) PCT Filed: Feb. 17, 2003

(86) PCT No.: PCT/JP03/01669

§ 371 (c)(1), (2), (4) Date: Aug. 26, 2004

(87) PCT Pub. No.: WO03/073648

PCT Pub. Date: Sep. 4, 2003

(65) Prior Publication Data
US 2005/0136932 A1  Jun. 23, 2005

(30) Foreign Application Priority Data
Feb. 28, 2002  (JP) .............................. 2002-052904

(51) Int. Cl.
H04M 1/00 (2006.01)
H04B 1/02 (2006.01)
H04B 1/38 (2006.01)
H04B 15/00 (2006.01)
H04B 17/00 (2006.01)
H04Q 7/20 (2006.01)

(52) U.S. Cl. .................. 455/450; 450/63.1; 450/67.11; 450/101; 450/103; 450/550.1; 450/561; 450/562.1

(58) Field of Classification Search ............. 455/422.1, 455/423–425, 550.1, 561, 101–103, 115.1, 455/126, 127.1, 132–138, 466, 450, 562.1, 455/226.1–226.3, 63.1–63.2, 59, 63.4, 65, 455/67.11, 61, 67.13, 62, 67.16, 418, 95, 455/464, 107, 556.2, 569.2, 575.7, 575.9, 455/114.2, 227–231, 332–334, 266, 434, 455/267–268, 299, 347
See application file for complete search history.

(56) References Cited

U.S. PATENT DOCUMENTS 5,894,598 A  4/1999  Shoki (Continued)

FOREIGN PATENT DOCUMENTS

JP  7-250116  9/1995

(Continued)

OTHER PUBLICATIONS

Kikuma, Nobuyoshi, "Adaptive Signal Processing by Array Antenna." Kagaku Gijutsu Shuppan, pp. 35-49, Nov. 1998.

(Continued)

*Primary Examiner*—Meless Zewdu
(74) *Attorney, Agent, or Firm*—McDermott Will & Emery LLP (57) ABSTRACT

In an MIMO mobile communication system in which a PDM base station communicates with a single terminal through a plurality of paths the terminal and the base station each collectively transmit control message for a plurality of paths through a path best in communication quality as based on the plurality of spatial paths' communication quality information. Furthermore the communication quality information is referred to to appropriately control the path's communication operation to switch between a plurality of types of operation. A first operation increases the path's transmission power and a second operation decreases the path's modulation level. These operations are performed by a DSP. Thus in the MIMO system the control message can be transmitted more efficiently with increased certainty.

45 Claims, 8 Drawing Sheets

U.S. PATENT DOCUMENTS

| | | | |
|---|---|---|---|
| 6,035,210 A * | 3/2000 | Endo et al. | 455/522 |
| 6,285,886 B1 * | 9/2001 | Kamel et al. | 455/522 |
| 6,314,300 B1 * | 11/2001 | Nakashima et al. | 455/517 |
| 6,396,821 B1 | 5/2002 | Takahashi | |
| 6,597,927 B1 * | 7/2003 | Eswara et al. | 370/334 |
| 6,728,307 B1 * | 4/2004 | Derryberry et al. | 375/219 |
| 6,771,706 B2 * | 8/2004 | Ling et al. | 375/267 |
| 6,785,341 B2 * | 8/2004 | Walton et al. | 375/267 |
| 6,859,503 B2 * | 2/2005 | Pautler et al. | 375/299 |
| 2003/0012318 A1 * | 1/2003 | Piirainen | 375/358 |

FOREIGN PATENT DOCUMENTS

| | | |
|---|---|---|
| JP | 9-074375 | 3/1997 |
| JP | 9-219675 | 8/1997 |
| JP | 10-163936 | 6/1998 |
| JP | 11-032030 | 2/1999 |

OTHER PUBLICATIONS

Nishimura, Toshihiko., et al. "SDMA Downlink Beamforming for MIMO Channel." Technical report IEICE, A-P2001-116, RCS2001-155, pp. 23-30, Oct. 2001.

Tomisato, Shigeru., et al. "Radio Signal Processing for Mobile MIMO Signal Transmission." Technical Report of IEICE, A-P2001-97, RCS2001-136, pp. 43-48, Oct. 2001.

* cited by examiner

SPATIAL PATH CONTROL IN RADIO COMMUNICATION SYSTEM

TECHNICAL FIELD

The present invention relates generally to radio apparatuses, radio communication systems, methods of controlling a spatial path and programs for controlling a spatial path, and in particular to radio apparatuses, radio communication systems, methods of controlling a spatial path and a program for controlling a spatial path that allow multiplex communication between a single radio terminal and a radio base station via a plurality of paths formed by space division.

BACKGROUND ART

In recent years in rapidly developing mobile communication systems (e.g., personal handyphone system (PHS)) a system referred to as path division multiple access (PDMA) has been proposed. This system can establish spatial multiple access from multiple users' mobile radio terminal devices (terminals) to a radio base station (a base station) via a plurality of paths formed by spatially dividing a single time slot of a single frequency to more efficiently use a frequency of a radio wave.

This PDMA system currently adopts adaptive array technology. Adaptive array processing is performed to calculate from a signal received from a terminal a weight vector formed of reception coefficients (weights) for respective antennas of a base station for adaptive control to accurately extract a signal from a desired terminal.

Such adaptive array processing allows an uplink signal from an antenna of each user terminal to be received by an array antenna of a base station and then isolated and extracted with reception directivity, and a downlink signal from the base station to the terminal to be transmitted from the array antenna with transmission directivity to the antenna of the terminal.

Such adaptive array processing is a well-known technique, and described in detail, for example, in Nobuyoshi Kikuma, "Adaptive Signal Processing by Array Antenna," Kagaku Gijyutsu Shuppan, pp. 35–49, "Chapter 3: MMSE Adaptive Array." Therefore, its operation's principle will not be described.

Figure 7A:
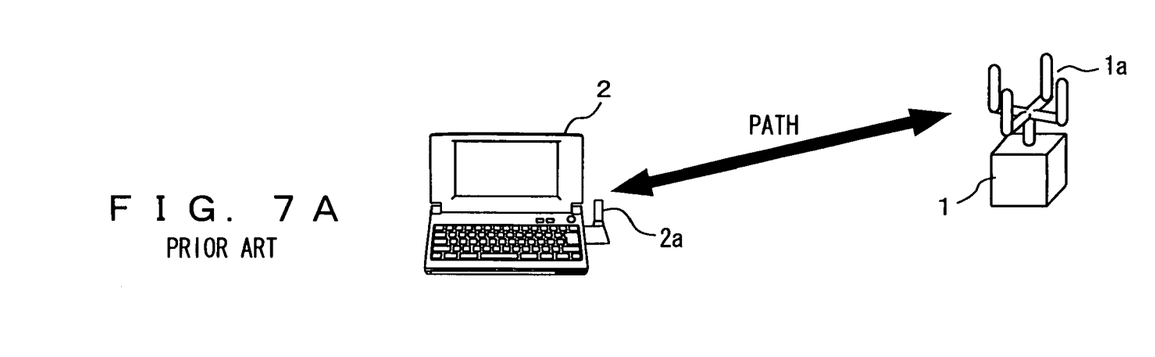
FIGS. 7A and 7B schematically show a concept of a manner of connection in a conventional, one-path-for-one-user scheme.

FIG. 7A is a conceptual view schematically illustrating an example in which a single terminal 2 with a single antenna is connected to a PDMA base station 1 via one of a plurality of paths formed by space division in a PDMA mobile communication system (PHS).

More specifically, PDMA base station 1 receives with an array antenna 1a an uplink signal from a single antenna 2a of terminal 2, and the signal is isolated and extracted with reception directivity through the above-described adaptive array processing. On the other hand, array antenna 1a of PDMA base station 1 transmits a downlink signal with transmission directivity to antenna 2a of terminal 2. Terminal 2 receives the downlink signal with antenna 2a without adaptive array processing.

Figure 7B:
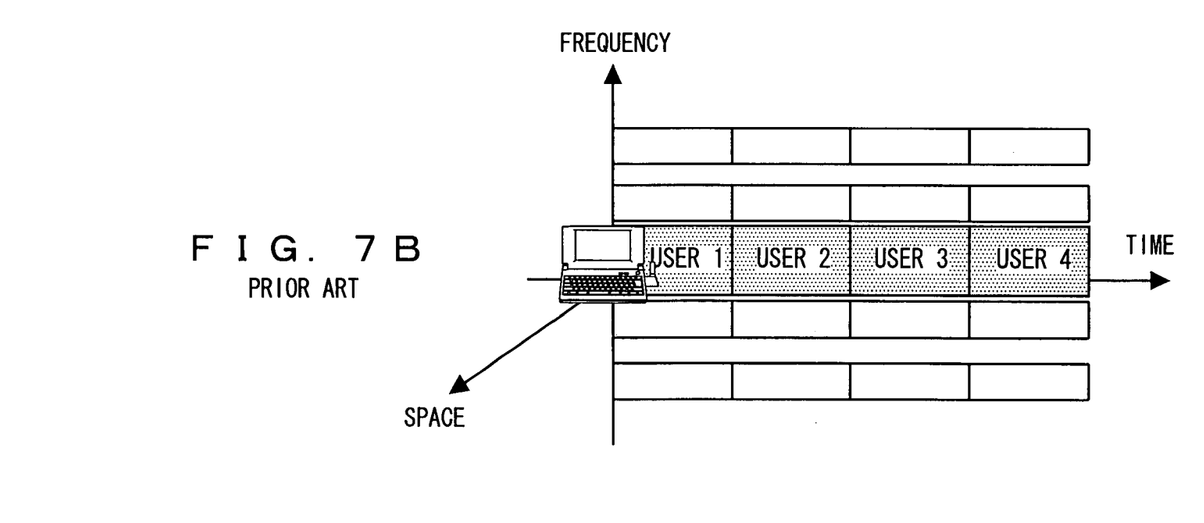

FIG. 7B is timing plots schematically showing a manner of channel allocation in this example. In the example of FIG. 7B, users 1 to 4 are time division multiplexed at respective time slots obtained by division in a direction of time base at a single frequency. Here, for each slot one user is allocated via a single path, as seen in a spatial direction.

In contrast, a Multi Input Multi Output (MIMO) system has been proposed, in which multiplex communication is established between a single terminal having a plurality of antennas and a PDMA base station via a plurality of spatial paths of a single identical frequency and a single time slot.

Such MIMO communication technology is described in detail, for example, in Nishimura et al., "SDMA Downlink Beamforming for a MIMO Channel," Technical Report of IEICE, A-P2001-116, RCS2001-155, pp. 23–30, October 2001, and in Tomisato et al, "Radio Signal Processing for Mobile MIMO Signal Transmission," Technical Report of IEICE, A-P2001-97, RCS2001-136, pp. 43–48, October 2001.

Figure 8A:
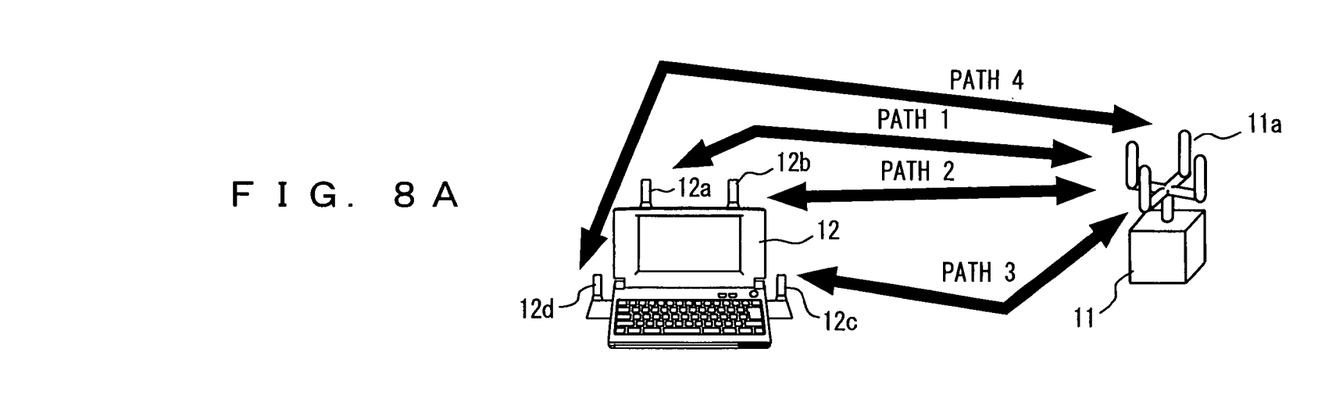
FIGS. 8A and 8B schematically show a concept of a manner of connection in a 4-paths-for-1-user scheme by the MIMO system.

FIG. 8A is a conceptual view schematically illustrating an example in which a single terminal 12 with four antennas establishes spatial multiple connection to a PDMA base station 11 via a plurality of paths (e.g. four paths) formed by space division in such a MIMO mobile communication system (PHS).

More specifically, PDMA base station 11 receives with an array antenna 11a uplink signals from respective four antennas 12a–12d of terminal 12, and the signals are isolated and extracted with reception directivity through the above-described adaptive array processing. On the other hand, array antenna 11a of PDMA base station 11 transmits downlink signals with transmission directivity to respective four antennas 12a–12d of terminal 12. Terminal 12 receives corresponding downlink signals with its respective antennas without adaptive array processing.

Figure 8B:
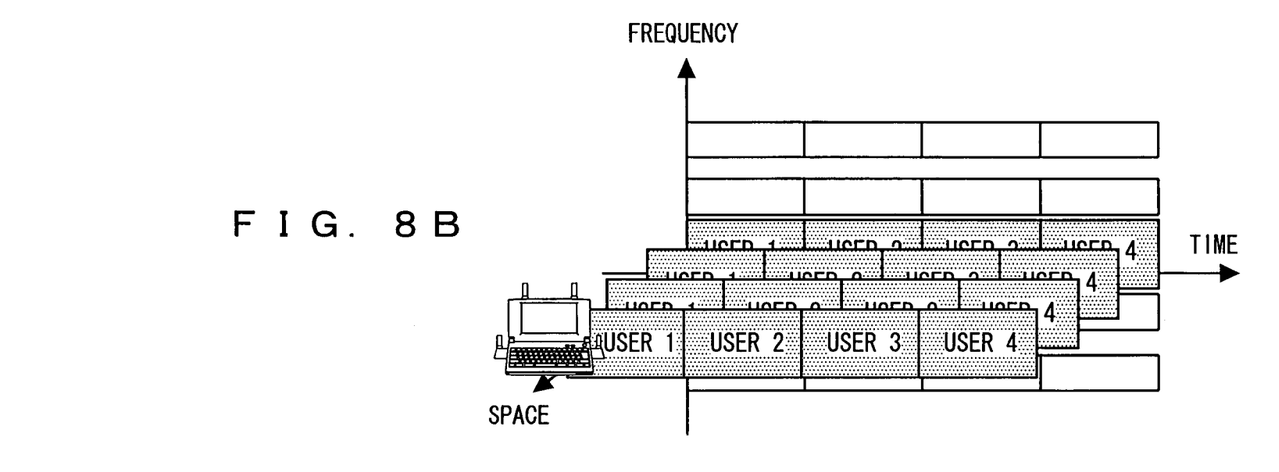

FIG. 8B is timing plots schematically showing a manner of channel allocation in this example. In the example of FIG. 8B, users 1 to 4 are time division multiplexed at respective time slots obtained by division in a direction of timebase at a single frequency. For each slot, as seen in a spatial direction, a single user is multiplexed for allocation via four paths.

For example, noting a first time slot in FIG. 8B, user 1 is allocated to all of the channels via four spatial paths. Then, a signal of user 1 is divided and transmitted between the terminal and the base station via four paths of the same slot, and the divided signals are reconfigured at a recipient. A four-paths-for-one-user scheme as shown in FIG. 8B can provide a four fold increase in communication rate, as compared with a one-path-for-one-user scheme in FIG. 7B.

Here, some of the plurality of spatial paths of the same slot in the PDMA system may be used to establish communication in multiple-paths-for-one-user scheme as shown in FIGS. 8A and 8B and the remaining paths may be used to establish communication in a one-path-for-one-user scheme as shown in FIGS. 7A and 7B.

A specific method of transmission/reception of a signal in the MIMO system as shown in FIGS. 8A and 8B is disclosed in detail in Japanese Patent Laying-Open No. 11-032030, for example.

The MIMO system as shown in FIGS. 8A and 8B adopts a multiple-paths for one user scheme and for example if there is an event to be controlled for a plurality of paths concurrently the plurality of paths each separately transmit between a terminal and a base station the control message related to an event to be controlled at the corresponding path. It is not preferable when signal transmission efficiency is considered, however, that a plurality of paths each independently transmit a control message, and if a path is impaired in quality of communication for some reason, the control message cannot be received through that path, and control required for that path might not be effected.

Therefore the present invention contemplates a radio apparatus, a radio communication system, a method of controlling a spatial path and a program for controlling a spatial path in a mobile communication system employing a multiple paths for one user scheme such as the MIMO system for communication, allowing efficient and reliable transmission between a terminal and a base station of control message controlling an event associated with a plurality of paths.

DISCLOSURE OF THE INVENTION

The present invention in one aspect provides a radio apparatus capable of forming a plurality of spatial paths to/from a separate single radio apparatus for communication, including message production means and path select means. The message production means produces a control message for transmitting individual control messages for the plurality of spatial paths through a single path collectively. The path select means selects, based on information of communication quality of the plurality of spatial paths, a spatial path best in communication quality as a spatial path for transmission of the control message.

Preferably the radio apparatus further includes operation select means selecting a communication operation of the selected spatial path, based on information of communication quality of the selected spatial path.

Preferably the operation select means selects an operation increasing transmission power of the selected spatial path.

Preferably the operation select means selects an operation changing a modulation system when the selected spatial path is capable of accommodating a plurality of modulation systems.

Preferably the radio apparatus is a radio apparatus in a base station of a mobile communication system and the separate single radio apparatus is a radio apparatus in a mobile terminal device of the mobile communication system.

Preferably the radio apparatus is a radio apparatus in a mobile terminal device of a mobile communication system and the separate single radio apparatus is a radio apparatus in a base station of the mobile communication system.

Preferably the base station is an adaptive array base station forming the plurality of spatial paths.

The present invention in another aspect provides a radio apparatus capable of forming a plurality of spatial paths to/from a separate single radio apparatus for communication, including message production means, path select means, and operation select means. The message production means produces a control message for transmitting individual control messages for the plurality of spatial paths through a single path collectively. The path select means selects, based on information of communication quality of the plurality of spatial paths, a spatial path best in communication quality as a spatial path for transmission of the control message. The operation select means selects, based on information of communication quality of the selected spatial path, one of a first operation increasing transmission power of the selected spatial path and a second operation changing a modulation system of the selected spatial path.

Preferably the operation select means selects the second operation when the selected spatial path is capable of accommodating a plurality of modulation systems.

Preferably the operation select means selects the first operation when the selected spatial path has a reception error rate exceeding a prescribed threshold value.

Preferably the apparatus is a radio apparatus in a base station of a mobile communication system and the separate single radio apparatus is a radio apparatus in a mobile terminal device of the mobile communication system.

Preferably the radio apparatus is a radio apparatus in a mobile terminal device of a mobile communication system and the separate single radio apparatus is a radio apparatus in a base station of the mobile communication system.

Preferably the base station is an adaptive array base station forming the plurality of spatial paths.

The present invention in still another aspect provides a radio communication system capable of forming a plurality of spatial paths between a first radio apparatus and a second radio apparatus for communication, the first and second radio apparatuses each including message production means and path select means. The message production means produces a control message for transmitting individual control messages for the plurality of spatial paths through a single path collectively. The path select means selects, based on information of communication quality of the plurality of spatial paths, a spatial path best in communication quality as a spatial path for transmission of the control message.

Preferably the first and second radio apparatuses each further include operation select means selecting a communication operation of the selected spatial path, based on information of communication quality of the selected spatial path.

Preferably the operation select means selects an operation increasing transmission power of the selected spatial path.

Preferably the operation select means selects an operation changing a modulation system when the selected spatial path is capable of accommodating a plurality of modulation systems.

Preferably one of the first and second radio apparatuses is a radio apparatus in a base station of a mobile communication system and the other of the first and second radio apparatuses is a radio apparatus in a mobile terminal device of the mobile communication system.

Preferably the base station is an adaptive array base station forming the plurality of spatial paths.

The present invention in still another aspect provides a spatial path control method performed in a radio apparatus capable of forming a plurality of spatial paths to/from a separate single radio apparatus for communication, including the steps of: producing a control message for transmitting individual control messages for the plurality of spatial paths through a single path collectively; and selecting, based on information of communication quality of the plurality of spatial paths, a spatial path best in communication quality as a spatial path for transmission of the control message.

Preferably the method further includes the step of selecting a communication operation of the selected spatial path, based on information of communication quality of the selected spatial path.

Preferably the step of selecting the communication operation selects an operation increasing transmission power of the selected spatial path.

Preferably the step of selecting the communication operation selects an operation changing a modulation system when the selected spatial path is capable of accommodating a plurality of modulation systems.

Preferably the radio apparatus is a radio apparatus in a base station of a mobile communication system and the separate single radio apparatus is a radio apparatus in a mobile terminal device of the mobile communication system.

Preferably the radio apparatus is a radio apparatus in a mobile terminal device of a mobile communication system and the separate single radio apparatus is a radio apparatus in a base station of the mobile communication system.

Preferably the base station is an adaptive array base station forming the plurality of spatial paths.

The present invention in still another aspect provides a spatial path control method performed in a radio apparatus capable of forming a plurality of spatial paths to/from a separate single radio apparatus for communication, including the steps of producing a control message for transmitting individual control messages for the plurality of spatial paths through a single path collectively; selecting, based on information of communication quality of the plurality of spatial paths, a spatial path best in communication quality as a spatial path for transmission of the control message; and selecting, based on information of communication quality of the selected spatial path, one of a first operation increasing transmission power of the selected spatial path and a second operation changing a modulation system of the selected spatial path.

Preferably the step of selecting one of the first and second operations selects the second operation when the selected spatial path is capable of accommodating a plurality of modulation systems.

Preferably the step of selecting one of the first and second operations selects the first operation when the selected spatial path has a reception error rate exceeding a prescribed threshold value.

Preferably the radio apparatus is a radio apparatus in a base station of a mobile communication system and the separate single radio apparatus is a radio apparatus in a mobile terminal device of the mobile communication system.

Preferably the radio apparatus is a radio apparatus in a mobile terminal device of a mobile communication system and the separate single radio apparatus is a radio apparatus in a base station of the mobile communication system.

Preferably the base station is an adaptive array base station forming the plurality of spatial paths.

The present invention in still another aspect provides a spatial path control program executed in a radio apparatus capable of forming a plurality of spatial paths to/from a separate single radio apparatus for communication, the program causing a computer to execute the steps of: producing a control message for transmitting individual control messages for the plurality of spatial paths through a single path collectively; and selecting, based on information of communication quality of the plurality of spatial paths, a spatial path best in communication quality as a spatial path for transmission of the control message.

Preferably the program further causes the computer to execute the step of selecting a communication operation of the selected spatial path, based on information of communication quality of the selected spatial path.

Preferably the step of selecting the communication operation selects an operation increasing transmission power of the selected spatial path.

Preferably the step of selecting the communication operation selects an operation changing a modulation system when the selected spatial path is capable of accommodating a plurality of modulation systems.

Preferably the radio apparatus is a radio apparatus in a base station of a mobile communication system and the separate single radio apparatus is a radio apparatus in a mobile terminal device of the mobile communication system.

Preferably the radio apparatus is a radio apparatus in a mobile terminal device of a mobile communication system and the separate single radio apparatus is a radio apparatus in a base station of the mobile communication system.

Preferably the base station is an adaptive array base station forming the plurality of spatial paths.

The present invention in still another aspect provides a spatial path control program executed in a radio apparatus capable of forming a plurality of spatial paths to/from a separate single radio apparatus for communication, the program causing a computer to execute the steps of: producing a control message for transmitting individual control messages for the plurality of spatial paths through a single path collectively; selecting, based on information of communication quality of the plurality of spatial paths, a spatial path best in communication quality as a spatial path for transmission of the control message; and selecting, based on information of communication quality of the selected spatial path, one of a first operation increasing transmission power of the selected spatial path and a second operation changing a modulation system of the selected spatial path.

Preferably the step of selecting one of the first and second operations selects the second operation when the selected spatial path is capable of accommodating a plurality of modulation systems.

Preferably the step of selecting one of the first and second operations selects the first operation when the selected spatial path has a reception error rate exceeding a prescribed threshold value.

Preferably the radio apparatus is a radio apparatus in a base station of a mobile communication system and the separate single radio apparatus is a radio apparatus in a mobile terminal device of the mobile communication system.

Preferably the radio apparatus is a radio apparatus in a mobile terminal device of a mobile communication system and the separate single radio apparatus is a radio apparatus in a base station of the mobile communication system.

Preferably the base station is an adaptive array base station forming the plurality of spatial paths.

Thus in accordance with the present invention a terminal or a base station in an MIMO mobile communication system can transmit control messages for a plurality of spatial paths collectively in a single control message through a single path to more efficiently transmit a signal and in addition as such a control message can be transmitted through a single selected path of satisfactory communication quality so that the message reaches a recipient with increased certainty.

BEST MODES FOR CARRYING OUT THE INVENTION

Hereinafter the present invention in embodiment will be described more specifically with reference to the drawings. Throughout the figures, like portions are identically denoted.

Figure 1:
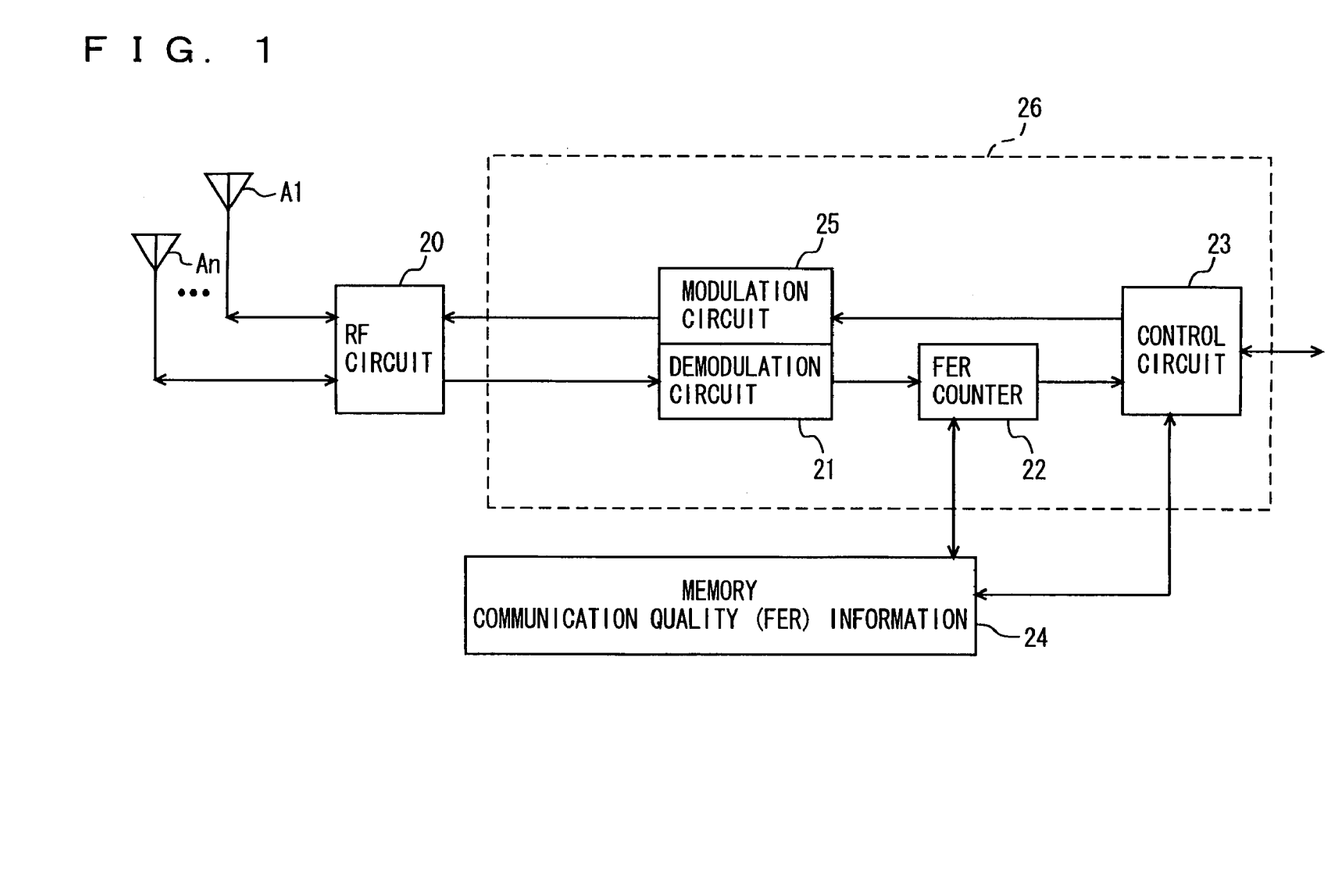
FIG. 1 is a functional block diagram showing a configuration of a PDMA base station in an embodiment of the present invention.

FIG. 1 is a functional block diagram showing a configuration of a PDMA base station accommodating an MIMO system in an embodiment of the present invention. With reference to FIG. 1, an array antenna formed of n antennas A1–An receives radio waves of a signal from a terminal (not shown) through a plurality of spatial paths. The signal is subjected by an RF circuit 20 to amplification, conversion in frequency and other similar, prescribed signal process, and then provided as a received signal to a digital signal processor (DSP) 26.

In the configuration of the PDMA base station shown in the functional block diagram of FIG. 1 a demodulation circuit 21, an FER counter 22, a control circuit 23 and a modulation circuit 25 have their functions implemented by the base station's DSP 26 by software.

The received signal input to DSP 26 is received by demodulation circuit 21 and demodulated as prescribed. The demodulated signal is output to FER counter 22 detecting a frame error rate (FER).

FER counter 22 counts the number of errors in a signal frame for each path. A resultant FER is stored to memory 24 as one element of communication quality information for evaluation of communication quality.

The demodulated signal the errors of which are counted by FER counter 22 is output to control unit 23. Control unit 23 communicates with memory 24, refers to uplink signal's communication quality information such as an FER held in memory 24, and controls a downlink spatial path by a method of controlling a spatial path in accordance with the present invention described later. Note that this PDMA base station performs a well known adaptive array processing, which is performed by DSP 26 by software, although for the sake of diagrammatic representation, it is performed by control circuit 23 for the sake of illustration.

Control circuit 23 outputs a demodulated signal which is in turn received by a modem (not shown).

The modem (not shown) passes a transmission signal which is in turn passed through control circuit 23 to modulation circuit 25 and modulated therein as prescribed and then output to RF circuit 20.

RF circuit 20 subjects each path's signal to a well known transmission process and transmits the signal through antennas A1–An with transmission directivity to an antenna of a corresponding terminal.

Figure 2:
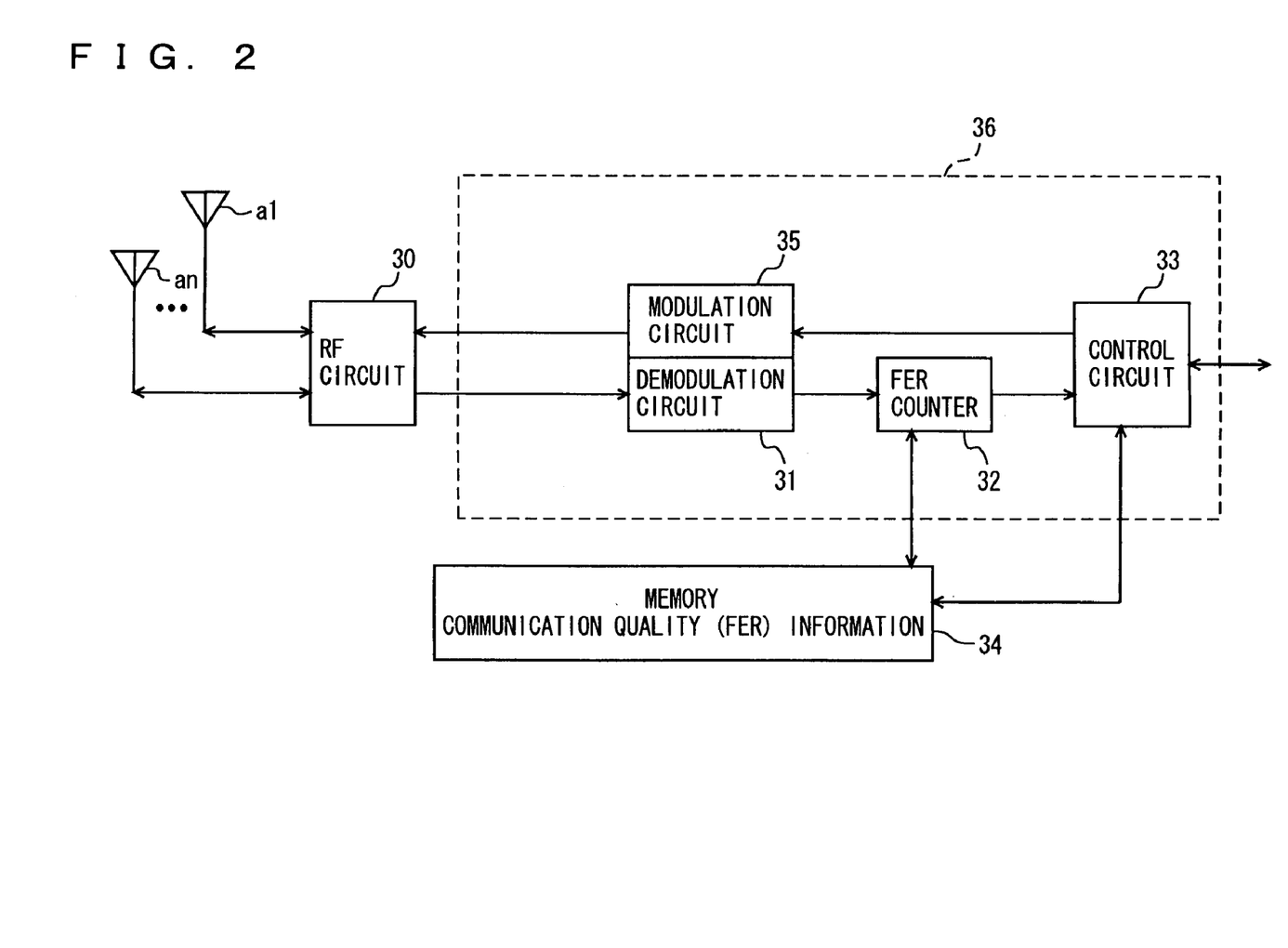
FIG. 2 is a functional block diagram showing a configuration of a terminal accommodating the MIMO system in an embodiment of the present invention.

FIG. 2 is a functional block diagram showing a configuration of a user terminal accommodating the MIMO system in an embodiment of the present invention. With reference to FIG. 2, from a PDMA base station (not shown) through n spatial paths n antennas a1–an each receive a radio wave of a signal. The signal is subjected by an RF circuit 30 to amplification, conversion in frequency, and other similar, prescribed signal process, and then fed as a received signal to a DSP 36.

In the configuration of the terminal shown in the functional block diagram of FIG. 2 a demodulation circuit 31, an FER counter 32, a control circuit 33 and a modulation circuit 35 have their functions implemented by the terminal's DSP 36 by software.

The received signal input to DSP 36 is received by demodulation circuit 31 and demodulated as prescribed. The demodulated signal is output to FER counter 32 detecting an FER.

FER-counter 32 counts the number of errors in a signal frame for each path. A resultant FER is stored to memory 34 as one element of communication quality information for evaluation of communication quality.

The demodulated signal the errors of which are counted by FER counter 32 is output to control unit 33. Control unit 33 communicates with memory 34, refers to downlink signal's communication quality information such as an FER held in memory 34, and controls an uplink spatial path by the method of controlling a spatial path in accordance with the present invention described later.

Note that unlike to the FIG. 1 PDMA base station, this terminal normally does not perform adaptive array reception, Control circuit 33 outputs a demodulated signal which is in turn received by a modem (not shown).

The modem (not shown) passes a transmission signal which is in turn passed through control circuit 33 to modulation circuit 35 and modulated therein as prescribed and then output to RF circuit 30.

RF circuit 30 subjects each path's signal to a well known transmission process and transmits the signal via antennas a1-an through corresponding spatial paths to a PDMA base station.

Thus in accordance with the present invention in an embodiment the FIG. 1 base station and the FIG. 2 terminal are different only in that the former performs adaptive array reception whereas the latter does not and otherwise they are common in configuration and function. It should be noted, however, that the terminal also has a plurality of antennas, so that these can be used as an array antenna to allow the terminal to perform adaptive array reception by using DSP 36 by software.

Conventionally, a control message for controlling an event corresponding to each of a plurality of paths is transmitted for the corresponding path separately. In the present invention, control messages for a plurality of paths are packed together and transmitted through a single path between a terminal and a base station, and furthermore, a path of the plurality of paths that is the best in quality of communication is selected and used to transmit the control messages for the plurality of paths collectively.

This is because even if each path does not individually transmit an associated control message a recipient's terminal or base station can receive control messages packed together and transmitted through a single path and, in accordance with the contents of the packed messages, can control the respective paths, as required.

Figure 3:
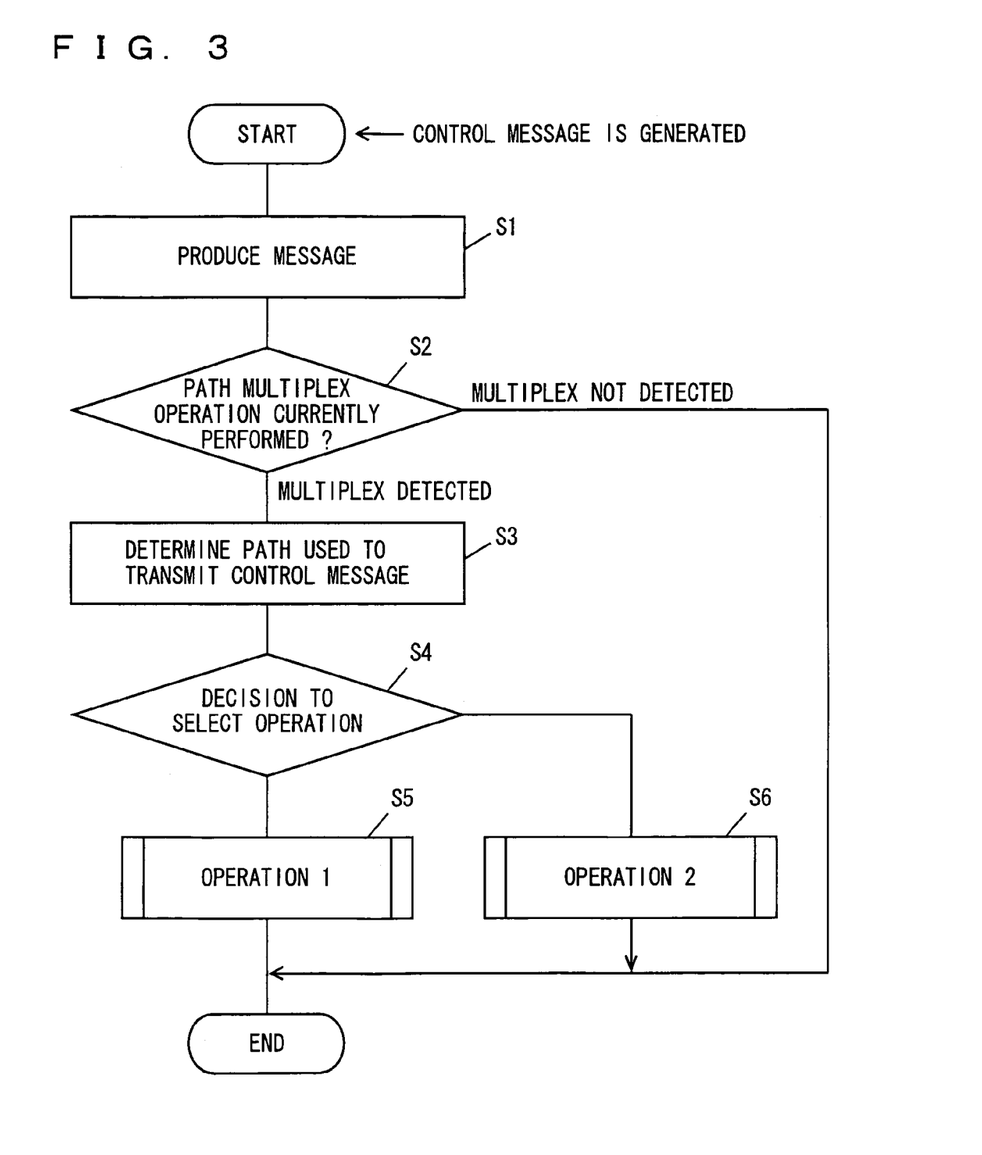
FIG. 3 is a flow chart for illustrating an operation of a terminal accommodating the MIMO system in an embodiment of the present invention.

FIG. 3 is a flow chart for illustrating the basic operation of the user terminal accommodating MIMO according to the embodiment of the present invention shown in FIG. 2, i.e., the terminal's operation performed to transmit an uplink control message from the terminal to a base station. The FIG. 3 operation is performed by the FIG. 2 terminal's DSP 36 by software.

Initially at the terminal a request is generated to transmit an uplink control message to the base station, and a process starts.

At step (S)1 the terminal produces an uplink control message for transmitting through a single path collectively control messages to be transmitted to the base station for a plurality of paths.

Then at S2 whether a path multiplex operation is effected to/from the base station is detected. If path multiplex operation is not detected, the process ends. If path multiplex is detected then S3 is performed to determine a path used to transmit the uplink control message.

More specifically, at S3, of multiplexed paths a path that is best in communication quality is selected. Note that to correctly select a path best in communication quality to successfully transmit an uplink control message from a terminal to a base station it is desirable that downlink communication quality as measured at the terminal as well as uplink communication quality as measured at the base station be known to the sender terminal.

Accordingly, information of uplink communication quality of multiplexed paths as measured at the base station is transmitted periodically from the base station to the terminal. Furthermore the terminal uniquely measures information of downlink communication quality of multiplexed paths. Note that in reality, uplink communication quality and downlink communication quality would not significantly be different and it is possible that downlink communication quality measured at the terminal substitutes for uplink communication quality.

Information of communication quality can include a downlink reception error measured at the FIG. 2 terminal by FER counter 32 as well as a downlink path's means square error (MSE) and other similar items. These items are stored in the FIG. 2 terminal at memory 34.

At S3, information of uplink communication quality provided from the base station and that of downlink communication quality as measured at the terminal are referred to to select a path of multiplexed paths that is best in communication quality as a path used to transmit an uplink control message.

Then S4 is performed to determine for the spatial path selected at S3 an operation to increase the possibility that through the path a control message arrives at the base station.

More specifically at S4 whether to proceed with or a first operation at S5, or a second operation at S6 is determined. The S4 decision of operation is made, as will be described hereinafter.

The first operation at S5 controls transmission power of a path of multiplexed paths that transmits a control message.

The second operation at S6 changes a modulation system of a path of multiplexed paths that transmits a control message to lower the path's modulation level. The first and second operations will more specifically be described hereinafter.

Before the first and second operations will more specifically be described, how in S4 an operation is determined, will first be described with reference to a specific example. In S4, information of communication quality is used to determine an operation of a spatial path to provide an increased possibility of arrival of a control message at a base station through a selected path.

At S4 an operation can be determined (or selected) in a first example as based on communication quality information of whether a spatial path selected to transmit a control message accommodates a plurality of modulation systems, i.e., the terminal and the base station both accommodate the plurality of modulation systems.

More specifically, if they accommodate a plurality of modulation systems the S6 second operation (changing a modulation system) is selected, otherwise the S5 first operation (controlling transmission power) is selected. While the second operation lowers a modulation level and reduces a path's communication rate, the operation enhances resistance to error and provides increased certainty with which a control message arrives at the base station.

At S4 an operation can be determined (or selected) in a second example as based on communication quality information of whether a spatial path selected to transmit a control message has a reception error rate exceeding a prescribed threshold value.

More specifically, if the reception error rate exceeds the prescribed threshold value then the S5 first operation (controlling transmission power) is selected, otherwise the S6 second operation (changing a modulation system) is selected if the spatial path is capable of accommodating a plurality of modulation systems. As the first operation increases transmission power, it is expected to effectively reduce uplink reception error.

When a reception error rate is so large that a threshold value is exceeded the second operation is not selected because a negotiation with the base station to change a modulation system may fail due to a reception error and the current modulation system may not be shifted to a different modulation system.

It should be noted, however, that the second operation is merely illustrative and for some set reception error threshold value when the threshold value is exceeded the second operation may be selected to lower a modulation level to control a selected path to achieve increased resistance to reception error.

Figure 4:
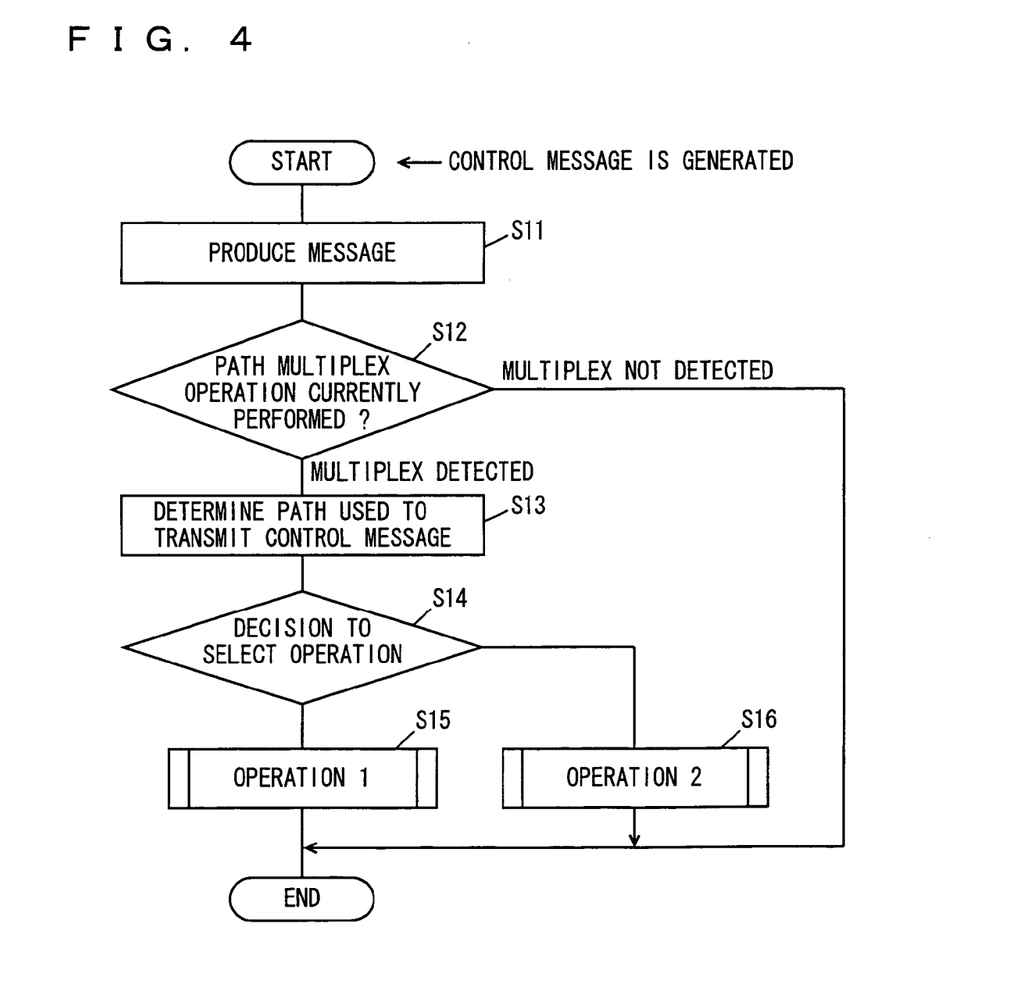
FIG. 4 is a flow chart for illustrating an operation of a PDMA base station in an embodiment of the present invention.

FIG. 4 is a flow chart for illustrating the basic operation of the PDMA base station accommodating MIMO according to the embodiment of the present invention shown in FIG. 1, i.e., an operation of a terminal that is performed to transmit a downlink control message from the base station to the terminal. The FIG. 4 operation is performed by the FIG. 1 base station's DSP 26 by software.

Initially at the base station a request is generated to transmit a downlink control message to a terminal and in response a process starts.

At S11 the base station produces a downlink control message for transmitting collectively through a single path control messages to be transmitted to the terminal for a plurality of paths.

Then at S12 whether a path multiplex operation is effected to/from the terminal is detected. If path multiplex is not detected, the current process ends. If path multiplex is detected, S13 is performed to determine a path used to transmit the downlink control message.

More specifically, at S13, of multiplexed paths a path that is best in communication quality is selected. Note that to correctly select a path best in communication quality to successfully transmit a downlink control message from a base station to a terminal it is desirable that uplink communication quality as measured at the base station as well as downlink communication quality as measured at the terminal be known to the sender base station.

Accordingly, information of downlink communication quality of multiplexed paths as measured at the terminal is transmitted periodically from the terminal to the base station. Furthermore the base station uniquely measures information of uplink communication quality of multiplexed paths. Note that in reality, uplink communication quality and downlink communication quality would not significantly be different and it is possible that uplink communication quality measured at the base station substitutes for downlink communication quality.

Information of communication quality can include a downlink reception error measured at the FIG. 1 base station by FER counter 22 as well as a downlink path's means square error (MSE) and other similar items. These items are stored in the FIG. 1 base station at memory 24.

At S13, information of downlink communication quality provided from the terminal and that of uplink communication quality as measured at the base station are referred to to select a path of multiplexed paths that is best in communication quality as a path used to transmit an uplink control message.

Then S14 is performed to determine for the spatial path selected at S13 an operation to increase the possibility that through the path a control message arrives at the terminal.

More specifically at S14 whether to proceed with a first operation at S15, or a second operation at S16 is determined. The S4 decision of operation is made, as will be described hereinafter.

The first operation at S15, as has been described previously, controls transmission power of a path of multiplexed paths that transmits a control message.

The second operation at S16, as has been described previously, changes a modulation system of a path of multiplexed paths that transmits a control message to lower the path's modulation level. The first and second operations will more specifically be described hereinafter.

At S14, an operation is determined, as has been described with reference to the FIG. 3 terminal's operation at S4 as the first and second examples.

Figure 5:
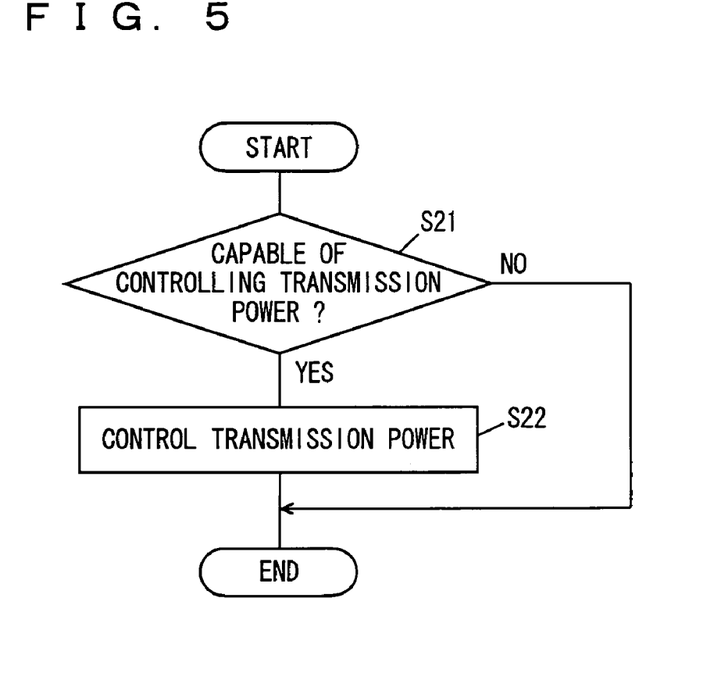
FIG. 5 is a flow chart specifically illustrating a first operation in controlling a spatial path in an embodiment of the present invention.

In FIG. 3 at S5 and FIG. 4 at S15 the first operation is performed, as will be described more specifically hereinafter. FIG. 5 represents the first operation in a flow chart. As has been described previously, the first operation controls transmission power to increase transmission power of a path of multiplexed paths that transmits a control message.

For example, there are four multiplexed connections between a terminal and a base station and a decision has been made that a spatial path of the first multiplexed connection is used to transmit a control message.

In that case, in FIG. 5 at S21 if the terminal sends an uplink control message the terminal makes a decision whether it can control transmission power and if the base station sends a downlink control message then the base station determines whether it can control transmission power. If not, the process ends. If it can, S22 is performed.

At S22 if the terminal sends an uplink control message the terminal increases transmission power of the selected path of the first multiplexed connection and decreases those of the remaining paths of the second to fourth multiplexed connections and if the base station sends a downlink control message then base station increases transmission power of the selected path of the first multiplexed connection and decreases those of the remaining paths of the second to fourth multiplexed connections to provide increased certainty of arrival of a control message transmitted through the selected path of the first multiplexed connection.

Figure 6:
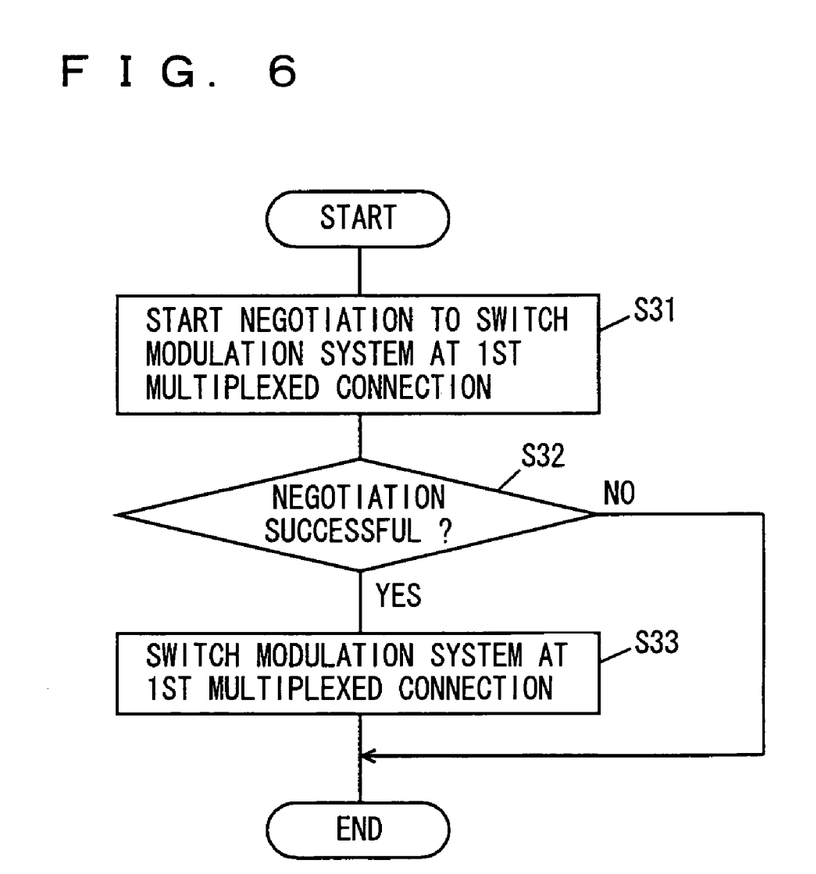
FIG. 6 is a flow chart specifically illustrating a second operation in controlling a spatial path in an embodiment of the present invention.

In FIG. 3 at S6 and FIG. 4 at S16 the second operation is performed, as will now be described more specifically hereinafter. FIG. 6 represents the second operation in a flow chart. As has been described previously, the second operation changes a modulation system of a spatial path with a reception error to lower the path's modulation level.

For example, there are four multiplexed connections between a terminal and a base station and a decision has been made that a spatial path of the first multiplexed connection is used to transmit a control message.

In that case S31 is performed and if the terminal transmits an uplink control message the terminal starts a negotiation with the base station for reducing a modulation level at the first multiplexed connection and if the base station transmits a downlink control message the base station starts a negotiation with the terminal for reducing a modulation level at the first multiplexed connection.

If a decision is made at 32 that the negotiation has failed, the current operation ends. If a decision is made that the negotiation is successful then 33 is performed to perform an operation to reduce a modulation level at first multiplexed connection.

Reducing a spatial path's modulation level means changing a modulation and demodulation system adopted at a terminal and a base station. For example, conventional PHS normally adopts a $\pi/4$ quadrature phase shift keying (QPSK) system as its modulation and demodulation system.

Recent mobile communication systems are required to provide transmission of higher quality and larger capacity than conventional audio communication, as done in data communication. To do so, applying a modulation and demodulation system of a larger multivalue (or higher modulation level) than the aforementioned, $\pi/4$ shift QPSK system, is being considered.

As one example of such a multivalue modulation and demodulation system, applying a well known, 16 quadrature amplitude modulation (QAM) system to PHS is being considered. Such a multivalue modulation demodulation system higher in level for modulation allows a higher communication rate, although it is susceptible to environment of radio wave and prone to reception error.

Accordingly, if a terminal and a base station are radio apparatuses switchable to accommodate both of the $\pi/4$ shift QPSK system and the 16 QAM system, and a spatial path in communication in the 16 QAM system, which is high in level for modulation, is selected to transmit a control message, the 16 QAM system is switched to the $\pi/4$ shift QPSK system as the latter system is lower in level for modulation and less prone to reception error. While this reduces a rate of communication in the spatial path, it prevents reception error to attempt to maintain communication.

Modulation and demodulation systems in mobile communication systems include not only the aforementioned 16 QAM, $\pi/4$ shift QPSK but also BPSK, QPSK, 8PSK and other various systems and the present invention is not limited to 16 QAM or $\pi/4$ shift QPSK. It only requires that a spatial path capable of accommodating a plurality of modulation and demodulation systems of different modulation levels be controlled to be changed from a high modulation level to a low modulation level.

To transmit a control message, a path of good communication quality is selected, as has been described above. If a path of particularly good communication quality is used to transmit the message, changing a modulation system to increase a modulation level, rather than to lower the level, can provide an increased communication rate to allow a single message to transmit more information. In any event, it is sufficient to control a modulation level adaptively to be increased or decreased to accommodate a path's communication quality and the present invention is not limited to reducing a modulation level, as described in the embodiment.

Thus in accordance with the present invention, a terminal or a base station in an MIMO mobile communication system transmits control message for a plurality of spatial paths through a selected single path of satisfactory communication quality to more efficiently transmit a signal and provide increased certainty with which the control message arrive at a recipient.

INDUSTRIAL APPLICABILITY

Thus the present invention provides a radio apparatus, a radio communication system, a spatial path control method and a spatial path control program suitable in an MIMO mobile communication system for transmitting a control message more efficiently with increased certainty.

The invention claimed is:

1. A radio apparatus for forming a plurality of spatial paths to/from a separate single radio apparatus for communication, comprising:
   a message production circuit for producing a control message for transmitting individual control messages for said plurality of spatial paths through a single path collectively; and
   a path select circuit for selecting, based on information of communication quality of said plurality of spatial paths, a spatial path best in communication quality as a spatial path for transmission of said control message.

2. The radio apparatus of claim 1, further comprising operation select circuit for selecting a communication operation of said selected spatial path, based on information of communication quality of said selected spatial path.

3. The radio apparatus of claim 2, wherein said operation select circuit selects an operation increasing transmission power of said selected spatial path.

4. The radio apparatus of claim 2, wherein said operation select circuit selects an operation changing a modulation system when said selected spatial path is capable of accommodating a plurality of modulation systems.

5. The radio apparatus of claim 1, wherein said radio apparatus is a radio apparatus in a base station of a mobile communication system and said separate single radio apparatus is a radio apparatus in a mobile terminal device of the mobile communication system.

6. The radio apparatus of claim 1, wherein said radio apparatus is a radio apparatus in a mobile terminal device of a mobile communication system and said separate single radio apparatus is a radio apparatus in a base station of the mobile communication system.

7. The radio apparatus of claim 5 or 6, wherein said base station is an adaptive array base station forming said plurality of spatial paths.

8. A radio apparatus for forming a plurality of spatial paths to/from a separate single radio apparatus for communication, comprising:
   a message production circuit for producing a control message for transmitting individual control messages for said plurality of spatial paths through a single path collectively;
   a path select circuit for selecting, based on information of communication quality of said plurality of spatial paths, a spatial path best in communication quality as a spatial path for transmission of said control message; and
   an operation select circuit for selecting, based on information of communication quality of said selected spatial path, one of a first operation increasing transmission power of said selected spatial path and a second operation changing a modulation system of said selected spatial path.

9. The radio apparatus of claim 8, wherein said operation select circuit selects said second operation when said selected spatial path is capable of accommodating a plurality of modulation systems.

10. The radio apparatus of claim 8, wherein said operation select circuit selects said first operation when said selected spatial path has a reception error rate exceeding a prescribed threshold value.

11. The radio apparatus of claim 8, wherein said radio apparatus is a radio apparatus in a base station of a mobile communication system and said separate single radio apparatus is a radio apparatus in a mobile terminal device of the mobile communication system.

12. The radio apparatus of claim 8, wherein said radio apparatus is a radio apparatus in a mobile terminal device of a mobile communication system and said separate single radio apparatus is a radio apparatus in a base station of the mobile communication system.

13. The radio apparatus of claim 11 or 12, wherein said base station is an adaptive array base station forming said plurality of spatial paths.

14. A radio communication system for forming a plurality of spatial paths between a first radio apparatus and a second radio apparatus for communication, said first and second radio apparatuses each including:
   a message production circuit for producing a control message for transmitting individual control messages for said plurality of spatial paths through a single path collectively; and
   a path select circuit for selecting, based on information of communication quality of said plurality of spatial paths, a spatial path best in communication quality as a spatial path for transmission of said control message.

15. The radio communication system of claim 14, wherein said first and second radio apparatuses each further include an operation select circuit for selecting a communication operation of said selected spatial path, based on information of communication quality of said selected spatial path.

16. The radio communication system of claim 15, wherein said operation select circuit selects an operation increasing transmission power of said selected spatial path.

17. The radio communication system of claim 15, wherein said operation select circuit selects an operation changing a modulation system when said selected spatial path is capable of accommodating a plurality of modulation systems.

18. The radio communication system of claim 14, wherein one of said first and second radio apparatuses is a radio apparatus in a base station of a mobile communication system and the other of said first and second radio apparatuses is a radio apparatus in a mobile terminal device of the mobile communication system.

19. The radio communication system of claim 18, wherein said base station is an adaptive array base station forming said plurality of spatial paths.

20. A spatial path control method performed in a radio apparatus for forming a plurality of spatial paths to/from a separate single radio apparatus for communication, comprising the steps of:
   producing a control message for transmitting individual control messages for said plurality of spatial paths through a single path collectively; and
   selecting, based on information of communication quality of said plurality of spatial paths, a spatial path best in communication quality as a spatial path for transmission of said control message.

21. The method of claim 20, further comprising the step of selecting a communication operation of said selected spatial path, based on information of communication quality of said selected spatial path.

22. The method of claim 21, wherein the step of selecting said communication operation selects an operation increasing transmission power of said selected spatial path.

23. The method of claim 21, wherein the step of selecting said communication operation selects an operation changing a modulation system when said selected spatial path is capable of accommodating a plurality of modulation systems.

24. The method of claim 20, wherein said radio apparatus is a radio apparatus in a base station of a mobile communication system and said separate single radio apparatus is a radio apparatus in a mobile terminal device of the mobile communication system.

25. The method of claim 20, wherein said radio apparatus is a radio apparatus in a mobile terminal device of a mobile communication system and said separate single radio apparatus is a radio apparatus in a base station of the mobile communication system.

26. The method of claim 24 or 25, wherein said base station is an adaptive array base station forming said plurality of spatial paths.

27. A spatial path control method performed in a radio apparatus for forming a plurality of spatial paths to/from a separate single radio apparatus for communication, comprising the steps of:
producing a control message for transmitting individual control messages for said plurality of spatial paths through a single path collectively;
selecting, based on information of communication quality of said plurality of spatial paths, a spatial path best in communication quality as a spatial path for transmission of said control message; and
selecting, based on information of communication quality of said selected spatial path, one of a first operation increasing transmission power of said selected spatial path and a second operation changing a modulation system of said selected spatial path.

28. The method of claim 27, wherein the step of selecting one of said first and second operations selects said second operation when said selected spatial path is capable of accommodating a plurality of modulation systems.

29. The method of claim 27, wherein the step of selecting one of said first and second operations selects said first operation when said selected spatial path has a reception error rate exceeding a prescribed threshold value.

30. The method of claim 27, wherein said radio apparatus is a radio apparatus in a base station of a mobile communication system and said separate single radio apparatus is a radio apparatus in a mobile terminal device of the mobile communication system.

31. The method of claim 27, wherein said radio apparatus is a radio apparatus in a mobile terminal device of a mobile communication system and said separate single radio apparatus is a radio apparatus in a base station of the mobile communication system.

32. The method of claim 30 or 31, wherein said base station is an adaptive array base station forming said plurality of spatial paths.

33. A spatial path control program executed in a radio apparatus for forming a plurality of spatial paths to/from a separate single radio apparatus for communication, the program on a computer readable medium causing a computer to execute the steps of:
producing a control message for transmitting individual control messages for said plurality of spatial paths through a single path collectively; and
selecting, based on information of communication quality of said plurality of spatial paths, a spatial path best in communication quality as a spatial path for transmission of said control message.

34. The program of claim 33, further causing the computer to execute the step of selecting a communication operation of said selected spatial path, based on information of communication quality of said selected spatial path.

35. The program of claim 34, wherein the step of selecting said communication operation selects an operation increasing transmission power of said selected spatial path.

36. The program of claim 34, wherein the step of selecting said communication operation selects an operation changing a modulation system when said selected spatial path is capable of accommodating a plurality of modulation systems.

37. The program of claim 33, wherein said radio apparatus is a radio apparatus in a base station of a mobile communication system and said separate single radio apparatus is a radio apparatus in a mobile terminal device of the mobile communication system.

38. The program of claim 33, wherein said radio apparatus is a radio apparatus in a mobile terminal device of a mobile communication system and said separate single radio apparatus is a radio apparatus in a base station of the mobile communication system.

39. The program of claim 37 or 38, wherein said base station is an adaptive array base station forming said plurality of spatial paths.

40. A spatial path control program executed in a radio apparatus for forming a plurality of spatial paths to/from a separate single radio apparatus for communication, the program on a computer readable medium causing a computer to execute the steps of:
producing a control message for transmitting individual control messages for said plurality of spatial paths through a single path collectively;
selecting, based on information of communication quality of said plurality of spatial paths, a spatial path best in communication quality as a spatial path for transmission of said control message; and
selecting, based on information of communication quality of said selected spatial path, one of a first operation increasing transmission power of said selected spatial path, and a second operation changing a modulation system of said selected spatial path.

41. The program of claim 40, wherein the step of selecting one of said first and second operations selects said second operation when said selected spatial path is capable of accommodating a plurality of modulation systems.

42. The program of claim 40, wherein the step of selecting one of said first and second operations selects said first operation when said selected spatial path has a reception error rate exceeding a prescribed threshold value.

43. The program of claim 40, wherein said radio apparatus is a radio apparatus in a base station of a mobile communication system and said separate single radio apparatus is a radio apparatus in a mobile terminal device of the mobile communication system.

44. The program of claim 40, wherein said radio apparatus is a radio apparatus in a mobile terminal device of a mobile communication system and said separate single radio apparatus is a radio apparatus in a base station of the mobile communication system.

45. The program of claim 43 or 44, wherein said base station is an adaptive array base station forming said plurality of spatial paths.

* * * * *